(12) United States Patent
Tateno

(10) Patent No.: US 12,566,090 B2
(45) Date of Patent: Mar. 3, 2026

(54) ELECTROMAGNETIC BALANCE WITH A TEMPERATURE SENSOR ACCOMMODATING RECESS

(71) Applicant: A&D COMPANY, LIMITED, Tokyo (JP)

(72) Inventor: Hiroaki Tateno, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 313 days.

(21) Appl. No.: 18/496,835

(22) Filed: Oct. 27, 2023

(65) Prior Publication Data

US 2024/0142298 A1 May 2, 2024

(30) Foreign Application Priority Data

Nov. 1, 2022 (JP) ................................. 2022-175354

(51) Int. Cl.
*G01G 23/48* (2006.01)
*G01G 7/02* (2006.01)

(52) U.S. Cl.
CPC .............. *G01G 23/48* (2013.01); *G01G 7/02* (2013.01)

(58) Field of Classification Search
CPC ............ G01G 23/48; G01G 7/02; G01G 7/04
See application file for complete search history.

(56) References Cited

U.S. PATENT DOCUMENTS

| | | | | | |
|---|---|---|---|---|---|
| 4,489,800 | A | * | 12/1984 | Nufer | G01G 7/04 177/DIG. 5 |
| 4,625,818 | A | * | 12/1986 | Knothe | G01G 7/04 177/157 |
| 4,722,409 | A | * | 2/1988 | Kunz | G01G 7/02 177/210 EM |
| 5,856,638 | A | * | 1/1999 | Burkhard | G01G 23/48 177/210 EM |
| 2008/0053249 | A1 | * | 3/2008 | Reber | G01G 23/10 73/1.15 |

(Continued)

FOREIGN PATENT DOCUMENTS

| | | | | |
|---|---|---|---|---|
| JP | 2518001 | B2 | * | 7/1996 |
| JP | 2000-039356 | A | | 2/2000 |

(Continued)

*Primary Examiner* — Natalie Huls
(74) *Attorney, Agent, or Firm* — Studebaker Brackett PLLC

(57) ABSTRACT

An electronic balance includes an electromagnetic unit including a yoke with a magnet disposed inside, and configured to achieve a balance with a load of a to-be-weighed object by supplying a current to a coil disposed in a magnetic field of the magnet, and a temperature sensor configured to detect a temperature of the electromagnetic unit, wherein the temperature sensor is attached to a flexible board including a sensor attaching portion to which the temperature sensor is attached and a lead wire portion configured to connect the temperature sensor to an A/D converter, a sensor accommodating recess capable of accommodating the temperature sensor is formed on a surface of the yoke, and the temperature sensor is attached to the electromagnetic unit so that the temperature sensor is accommodated in the sensor accommodating recess, and the sensor attaching portion closes the sensor accommodating recess.

13 Claims, 17 Drawing Sheets

(56)              References Cited

U.S. PATENT DOCUMENTS

2013/0083326 A1*   4/2013   Clark ...................... G01K 1/16
                                                             374/185
2018/0073937 A1*   3/2018   Shih ...................... F21V 19/003
2020/0292373 A1*   9/2020   Reber ...................... G01G 7/02

FOREIGN PATENT DOCUMENTS

JP              3570373  B2 *   9/2004
JP              2006138665  A  *   6/2006
JP              2019-056589  A      4/2019

* cited by examiner

FIG. 13A $\underline{1H}$
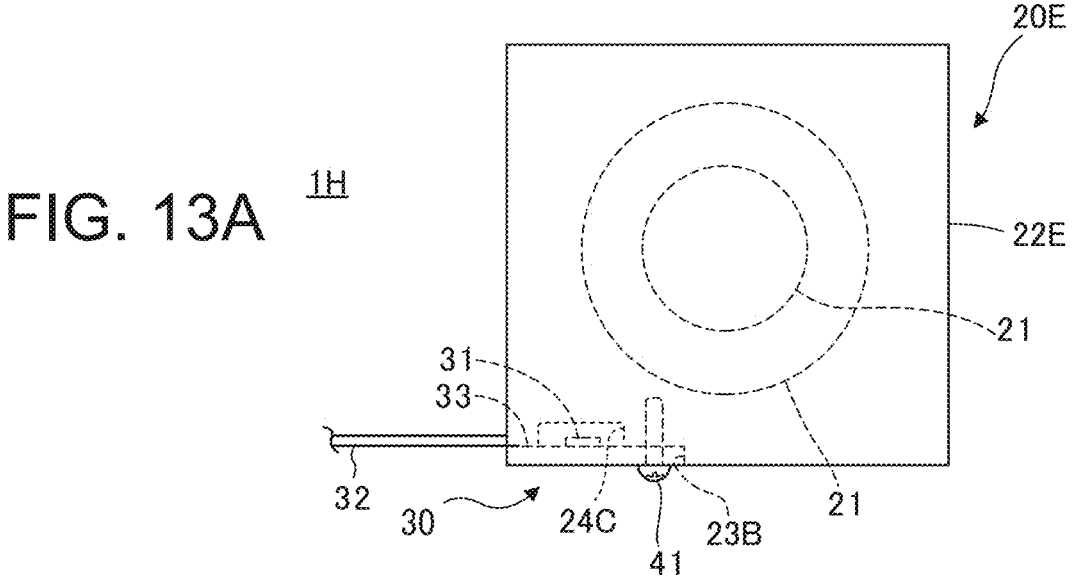
FIG. 13B
$\underline{1H}$
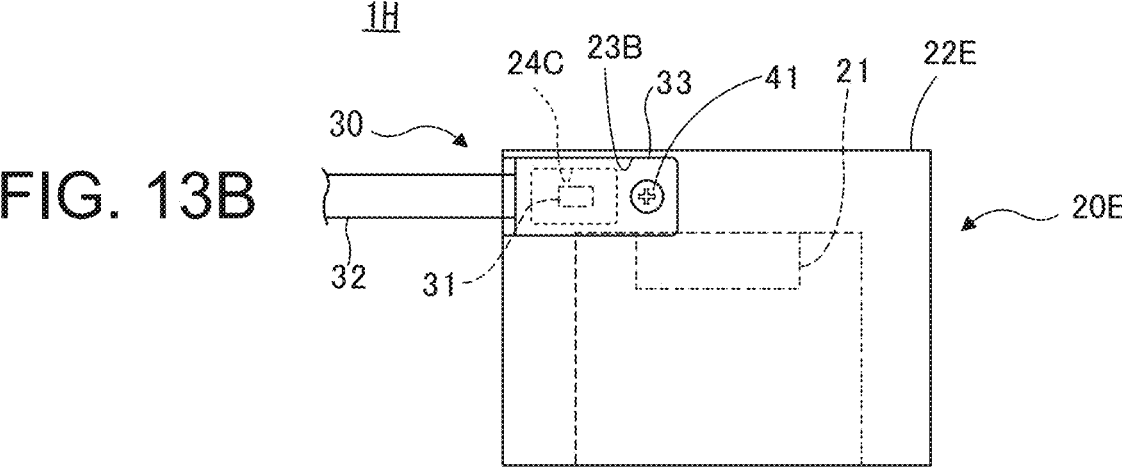

Prior Art

ELECTROMAGNETIC BALANCE WITH A TEMPERATURE SENSOR ACCOMMODATING RECESS

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2022-175354 filed Nov. 1, 2022. The contents of this application are incorporated herein by reference in their entirely.

TECHNICAL FIELD

The present disclosure relates to an electronic balance, more specifically, to an electromagnetic balance type electronic balance.

BACKGROUND

Conventionally, as an electronic balance, an electromagnetic balance type electronic balance is known which detects a displacement of a beam caused by a load of a to-be-weighed object placed on a weighing pan based on a voltage, and measures a mass based on a current value for generating an electromagnetic force for canceling the displacement and restoring the beam to equilibrium.

This electromagnetic force for restoring the beam to equilibrium is normally generated by an electromagnetic unit including a force coil, a magnet, and a yoke. It is known that a magnetic flux changes with a temperature change caused by temperature characteristics of a material forming the magnet. Therefore, in an electromagnetic balance type electronic balance, a temperature sensor is provided near the magnet to detect a temperature of the magnet, and a weighed value is corrected according to the temperature (refer to, for example, Patent Literatures 1 and 2, etc.).

CITATION LIST

Patent Literatures

Patent Literature 1: Japanese Published Unexamined Patent Application No. 2000-039356
Patent Literature 2: Japanese Published Unexamined Patent Application No. 2019-056589

TECHNICAL PROBLEM SUMMARY OF INVENTION

However, details of a method for attaching the temperature sensor to the electromagnetic unit are not disclosed in Patent Literatures 1 and 2. Specifically, Patent Literature 1 only discloses in Paragraph 0013 that a temperature sensor is provided on or near the magnet to detect a measured temperature. In addition, Patent Literature 2 only discloses in Paragraph 0032 that a temperature sensor is attached to the magnet directly or indirectly via a yoke 22.

According to a product, a method for attaching a temperature sensor to an electromagnetic unit in a conventional electronic balance is such that, for example, as illustrated in FIG. 17, a circular hole 93 into which a temperature sensor 94 can be inserted is made in a side surface of a yoke 91, the temperature sensor 94 is inserted into this hole and a heat-conductive resin is filled and cured. This attaching method requires time and effort such as requiring overnight curing. Therefore, development of an electronic balance in which the temperature sensor 94 can be easily attached to the electromagnetic unit had been desired.

The present invention was made in view of the circumstances described above, and an object thereof is to provide an electronic balance in which a temperature sensor that detects a temperature of a magnet is easily attached to an electromagnetic unit.

Solution to Problem

In order to achieve the object described above, an electronic balance according to an aspect of the present invention is configured as described below.

1. An electronic balance includes an electromagnetic unit including a magnet, a yoke which a magnet is disposed inside, and a coil disposed in a magnetic field of the magnet, and configured to achieve a balance with a load of a to-be-weighed object by supplying a current to the coil, a temperature sensor configured to detect a temperature of the electromagnetic unit, and an A/D converter to be connected to the electromagnetic unit and the temperature sensor, wherein the temperature sensor is attached to a flexible board including a sensor attaching portion to which the temperature sensor is attached and a lead wire portion configured to connect the temperature sensor to the A/D converter, a sensor accommodating recess capable of accommodating the temperature sensor is formed on a surface of the yoke, and the temperature sensor is attached to the electromagnetic unit so that the temperature sensor is accommodated in the sensor accommodating recess, and the sensor attaching portion closes the sensor accommodating recess.

2. In the electronic balance described in 1 above, it is also preferable that a positioning recess having a shape to fit the sensor attaching portion is formed on a surface of the yoke, the sensor accommodating recess is formed on a bottom surface of the positioning recess, and the temperature sensor is attached so that the temperature sensor is accommodated in the sensor accommodating recess, and the sensor attaching portion fits into the positioning recess.

3. In the electronic balance described in 1 or 2 above, it is also preferable that at least one surface of the flexible board is shielded.

4. In the electronic balance described in any of 1 to 3 above, it is also preferable that the sensor attaching portion is supported by a support member having a flat plate shape conforming to a shape of the sensor attaching portion.

5. In the electronic balance described in 4 above, it is also preferable that the support member is a metal plate.

6. In the electronic balance described in any of 1 to 5 above, it is also preferable that the electronic balance includes a heat-conductive resin sheet between the bottom surface of the sensor accommodating recess and the temperature sensor.

7. In the electronic balance described in any of 1 to 6 above, it is also preferable that the flexible board is attached by screwing to the yoke by screwing a threaded hole formed on the bottom surface of the positioning recess and a hole provided in the sensor attaching portion with each other by a screw.

8. An electronic balance according to another aspect of the present invention includes an electromagnetic unit including a magnet, a yoke which the magnet is disposed inside, and a coil disposed in a magnetic field of the magnet, and configured to achieve a balance with a load of a to-be-weighed object by supplying a current to the coil, a temperature sensor configured to detect a temperature of the electromagnetic unit, and an A/D converter to be connected to the electromagnetic unit and the temperature sensor, wherein the temperature sensor is attached to a flexible board including a sensor attaching portion to which the temperature sensor is attached and a lead wire portion configured to connect the temperature sensor to the A/D converter, a sensor accommodating recess capable of accommodating the temperature sensor is formed on a surface of the yoke, and the temperature sensor is attached to the electromagnetic unit so that the temperature sensor is accommodated in the sensor accommodating recess, and the sensor attaching portion and a metal tape close the sensor accommodating recess.

Benefit of Invention

According to the aspects described above, an electronic balance in which a temperature sensor for detecting a temperature of a magnet can be easily attached can be provided.

BRIEF DESCRIPTION OF DRAWINGS

FIGS. 12A and 12B are views describing an attaching structure of a temperature detecting unit to an electromagnetic unit of an electronic balance according to still another modification.

FIGS. 13A and 13B are views describing an attaching structure of a temperature detecting unit to an electromagnetic unit of an electronic balance according to still another modification.

FIG. 15 is a view describing an attaching structure of a temperature detecting unit to an electromagnetic unit of an electronic balance according to still another modification.

DESCRIPTION OF EMBODIMENTS

Figure 1:
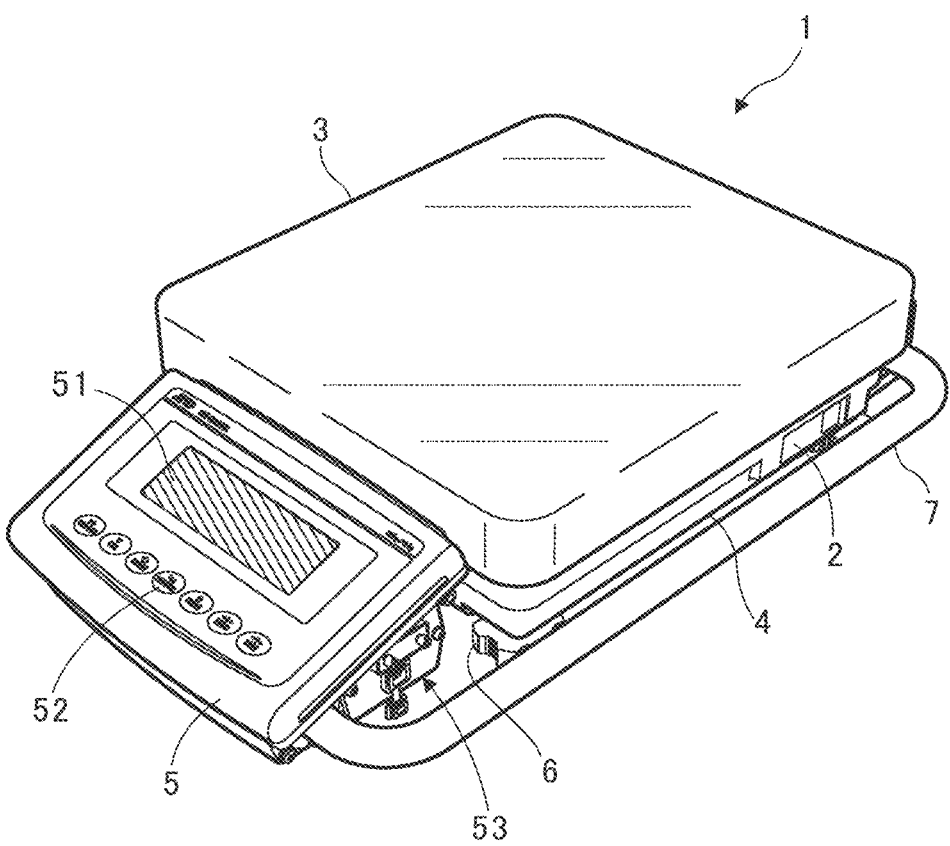
FIG. 1 is an external perspective view of an electronic balance according to an embodiment of the present invention.

Hereinafter, an embodiment according to the present invention will be described with reference to the drawings, however, the present invention is not limited thereto. Dimensions of each component in the drawings are drawn by being appropriately enlarged or reduced in size for the sake of description, and the scale is not always accurate. In descriptions of modifications given below, members having the same configurations as those of members described in the embodiment are provided with the same reference signs, and detailed descriptions thereof will be omitted as appropriate.

FIG. 1 is an external perspective view of an electronic balance 1 according to an embodiment. The electronic balance 1 is a so-called electromagnetic balance type electronic balance. The electronic balance 1 includes a balance main body 2, a weighing pan 3, and a display unit 5 in appearance.

The balance main body 2 is defined by a box-shaped main body case 4 that is quadrangular in a plan view, and houses inside a weighing mechanism 10 that will be described later. The balance main body 2 includes a leveling leg portion 6 at a bottom portion. The weighing pan 3 is connected to the weighing mechanism 10 via a pan shaft (not illustrated) provided at a center of the main body.

The display unit 5 includes a display 51 and an operation button 52 on an upper surface, and includes an external interface 53 such as a USB (Universal Serial Bus) port or RS-232C on a side surface. The display unit 5 is connected to the balance main body 2 by a substantially U-shaped arm 7, and can be moved up and down by moving the arm 7 up and down.

Figure 2:
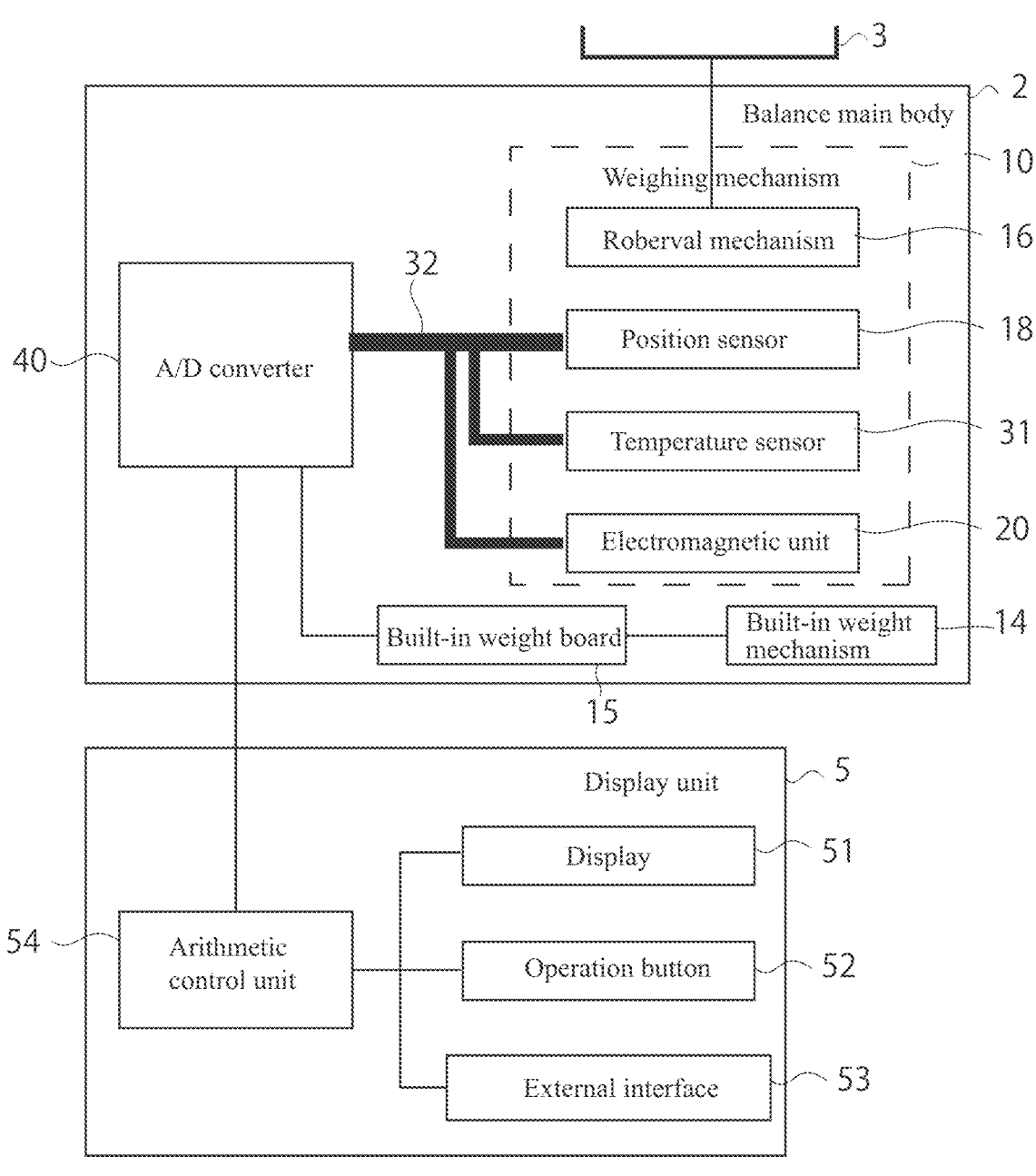
FIG. 2 is a configuration block diagram of the same electronic balance.
Figure 3A:
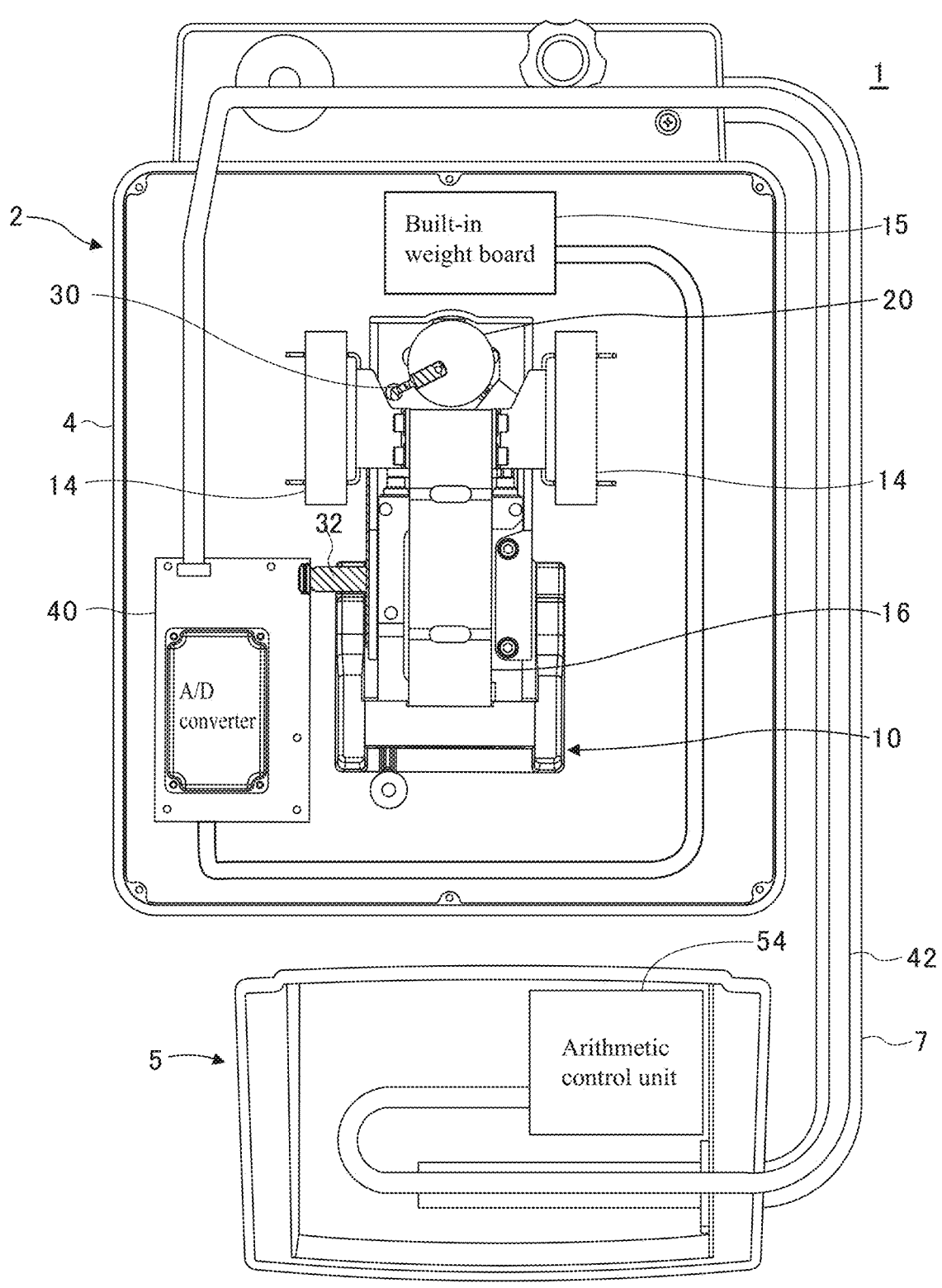
FIG. 3A is a plan view illustrating a structure inside a main body and inside a display unit of the same electronic balance.
Figure 3B:
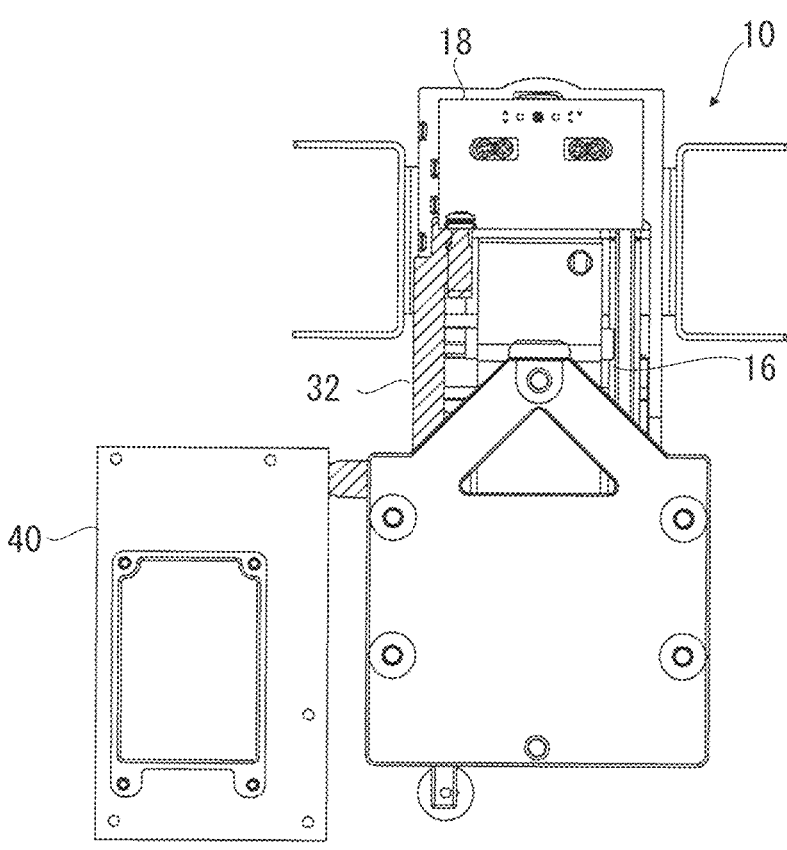
FIG. 3B is a bottom view of a weighing mechanism of the same electronic balance.

FIG. 2 is a block diagram of the electronic balance 1, and FIG. 3A is a view illustrating an internal structure of the balance main body 2 and the display unit 5. FIG. 3B is a bottom view of the periphery of the weighing mechanism 10 in the balance main body 2.

The weighing mechanism 10 is disposed in a center portion of the balance main body 2. The weighing mechanism 10 includes a Roberval mechanism 16, a position sensor 18, an electromagnetic unit 20, and a temperature detecting unit 30 including a temperature sensor 31.

The Roberval mechanism 16 includes a frame, upper and lower beams, and a floating frame, and transmits a load of a to-be-weighed object placed on the weighing pan 3 as a displacement of the beams.

The position sensor 18 detects a displacement of the beams. As the position sensor 18, a publicly known position sensor, for example, an optical type (light emitting and receiving elements), a capacitance type, a differential transformer type, or the like can be used.

Figure 4:
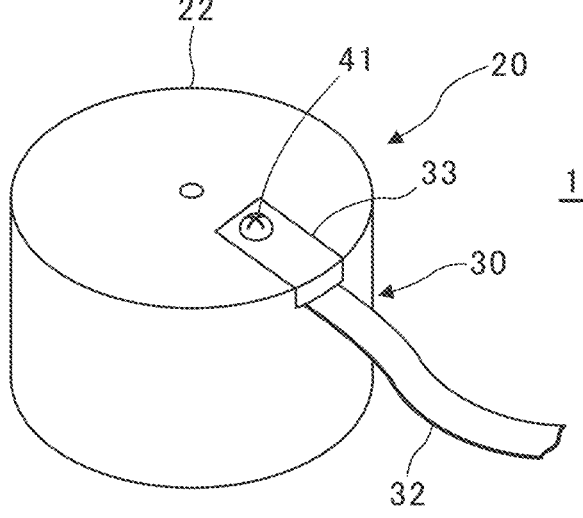
FIG. 4 is a perspective view illustrating an external appearance of an electromagnetic unit to which a temperature detecting unit is attached of the same electronic balance.

The electromagnetic unit 20 includes a force coil (not illustrated) that outputs a compensating current so as to correct a displacement of the beams, a magnet (permanent magnet) 21 (FIG. 6A), and a yoke 22 (FIG. 4). The force coil outputs a compensating current to correct a displacement of the beams in accordance with a displacement amount of the beams detected by the position sensor 18, and outputs a signal corresponding to a current value to restore the beams to equilibrium.

The magnet 21 is, for example, an aluminum-nickel-cobalt (alnico) alloy magnet, or a rare-earth magnet of samarium, cobalt, etc. The yoke 22 is a cylindrical member having a thick upper surface, and to an inner upper surface, that is, to a lower portion of an upper surface, the magnet 21 is attached. As a material of the yoke 22, for example, a sulfur-composite free-cutting steel material such as SUM 22, and aluminum, etc., can be employed.

The temperature detecting unit 30 generally includes the temperature sensor 31, and a flexible board (hereinafter, referred to as FPC (Flexible printed Circuits) 32 illustrated with shading in FIGS. 3A and 3B. As the temperature sensor 31, a thermistor, a transistor, a diode, a thermocouple, or the like can be used. Use of a transistor is advantageous in terms of price. When a transistor is used, a temperature is detected as a voltage drop of the temperature sensor 31, and the voltage drop is converted into a temperature by an arithmetic control unit 54.

The position sensor 18, the force coil of the electromagnetic unit 20, and the temperature sensor 31 of the temperature detecting unit 30 are connected to an A/D converter 40 by the FPC 32, and output respective output signals to the A/D converter 40.

In the illustrated example, the balance main body 2 includes a built-in weight mechanism 14 that loads and unloads a built-in weight for adjusting sensitivity, and a built-in weight board 15 for controlling the loading and unloading of a built-in weight. The built-in weight board 15 is also connected to the A/D converter 40.

The A/D converter 40 is includes an analog/digital converting circuit mounted on a board, and converts analog signals output from the position sensor 18, the force coil of the electromagnetic unit 20, and the temperature sensor 31 to digital signals, and outputs the digital signals to the arithmetic control unit 54.

The display unit 5 includes the arithmetic control unit 54 inside in addition to the above-described display 51, operation button 52, and external interface 53. The arithmetic control unit 54 is connected to the A/D converter 40 by a cable 42 through the inside of the arm 7.

The display 51 is, for example, a liquid crystal display. The operation button 52 are buttons for operating the electronic balance 1, for example, a power button, a mode change button, a zero-point button, and a tare subtraction button, etc. The display 51 and the operation button 52 may be integrally configured as a touch panel display. The external interface 53 is an interface for communication with the outside as described above.

The arithmetic control unit 54 is, for example, a microcontroller including, at least one processor (for example, CPU (Central Processing Unit)) and at least one memory (for example, DRAM (Dynamic Random Access Memory), SRAM (Static Random Access Memory), etc.) on a board. The arithmetic control unit 54 controls the built-in weight mechanism 14 through the A/D converter 40. The arithmetic control unit 54 generates weighing data based on a current value input from the electromagnetic unit 20, calculates a temperature from a voltage value input from the temperature sensor 31 to corrects the weighing data and calculates a weighed value based on the temperature data.

Figure 5A:
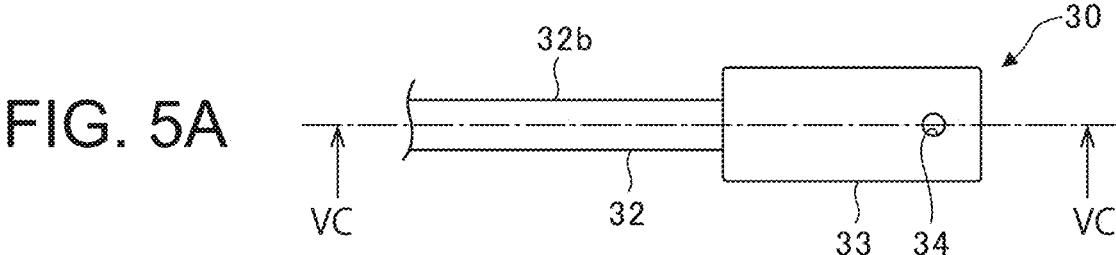
FIGS. 5A to 5D are views describing the temperature detecting unit of the same electronic balance.
Figure 5B:
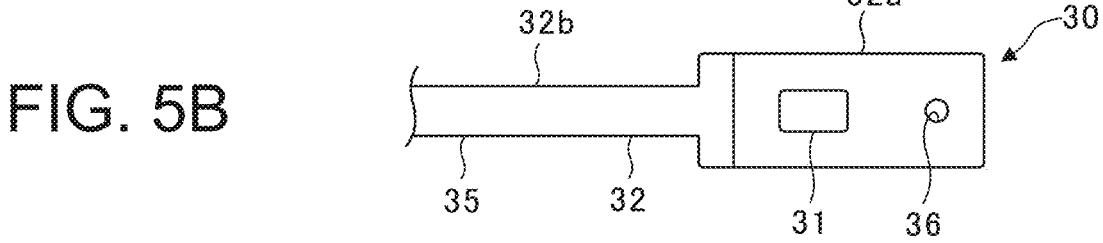
Figure 5C:
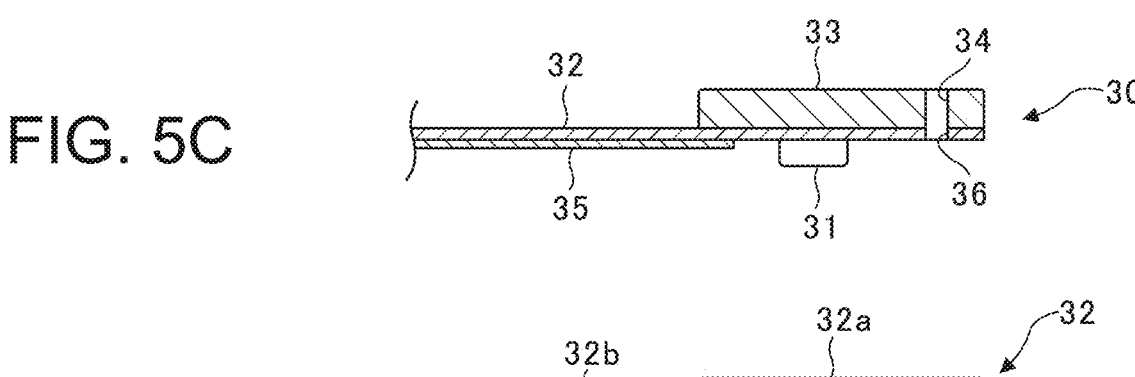
Figure 5D:
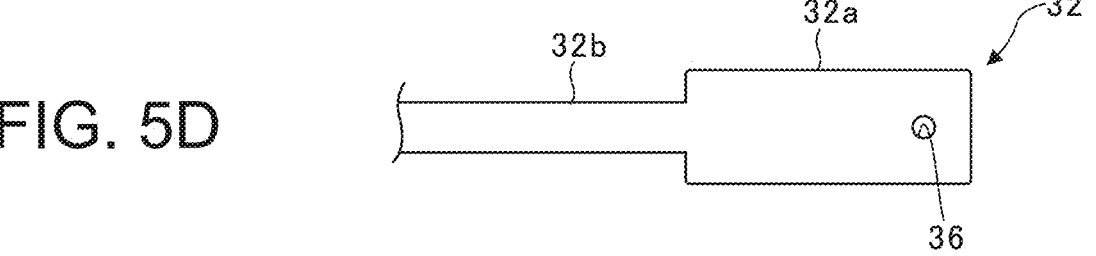
Figure 6A:
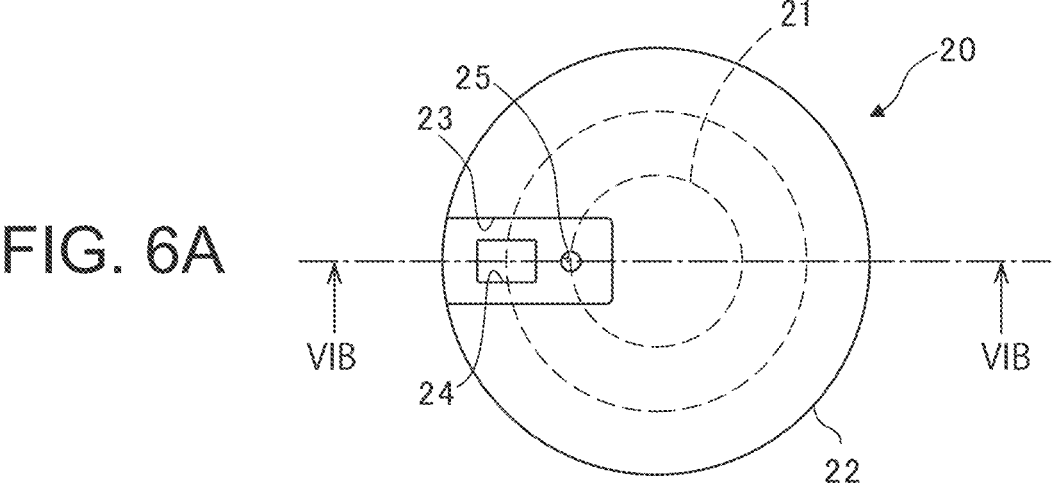
FIGS. 6A and 6B are views describing the electromagnetic unit of the same electronic balance.
Figure 6B:
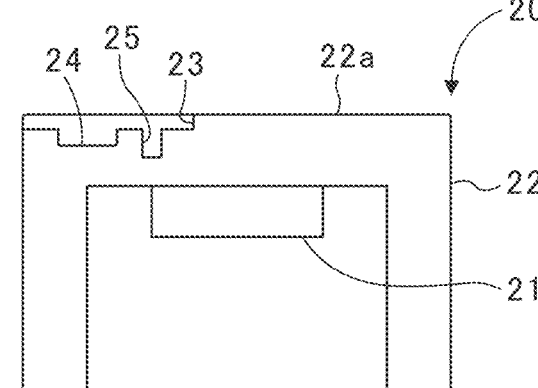
Figure 7A:
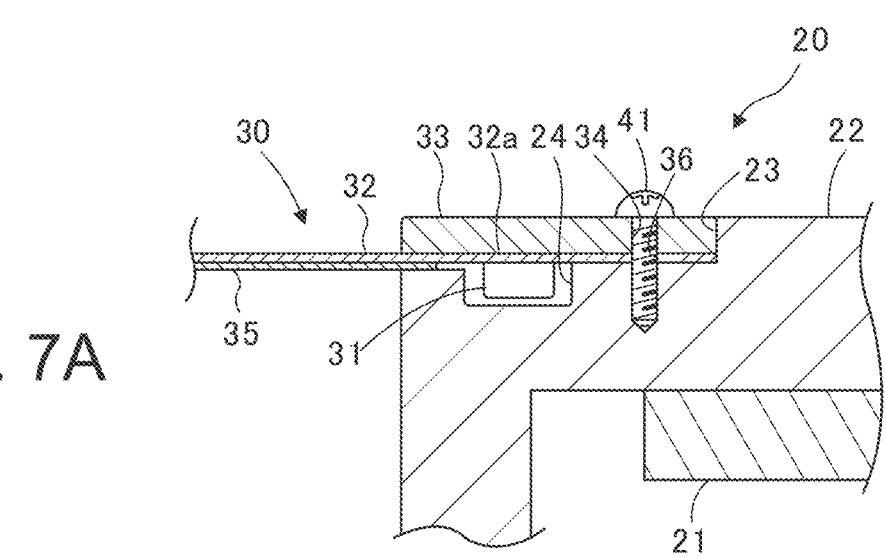
FIGS. 7A and 7B are sectional views illustrating a state where the temperature detecting unit is attached to the electromagnetic unit of the same electronic balance.
Figure 7B:
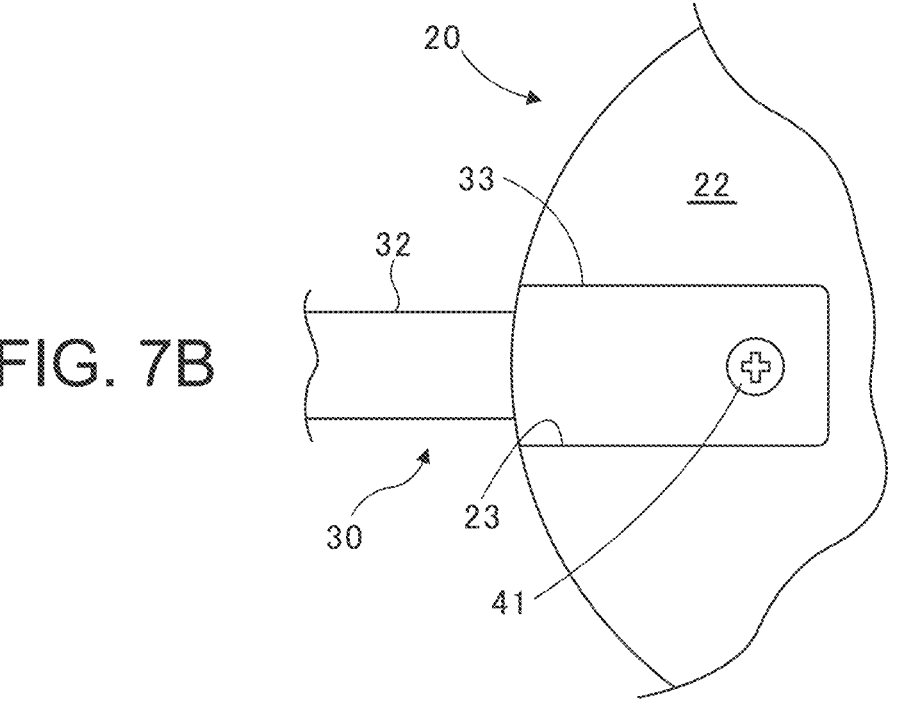

Hereinafter, an attaching structure of the temperature detecting unit 30 to the electromagnetic unit 20 will be described in detail with reference to FIGS. 4 to 7A and 7B. FIG. 4 is an external perspective view of the electromagnetic unit 20 in a state where the temperature detecting unit 30 is attached to the electromagnetic unit 20. FIG. 5A is a plan view of the temperature detecting unit 30. FIG. 5B is a bottom view of the temperature detecting unit 30. FIG. 5C is a sectional view of the temperature detecting unit 30 taken along line VC-VC in FIG. 5A. FIG. 5D is a plan view of the FPC 32 of the temperature detecting unit 30. FIG. 6A is a plan view of the electromagnetic unit 20, and FIG. 6B is a sectional view of the electromagnetic unit 20 taken along line VIB-VIB in FIG. 6A. FIG. 7 is a sectional view illustrating a state where the temperature detecting unit 30 is attached to the electromagnetic unit 20. In each figure, a portion extending to the side opposite to a sensor attaching-side end portion of the FPC 32 is omitted.

As illustrated in FIGS. 5A to 5C, the temperature sensor 31 is attached to one end portion of the FPC 32. The FPC 32 includes a sensor attaching portion 32a that is rectangular in a plan view, and is formed so that a lead wire portion 32b with a narrowed width extends from one side of the sensor attaching portion 32a. The shape of the sensor attaching portion 32a is not limited to be rectangular, and may be an arbitrary shape such as a circular shape or a hexagonal shape, however, being in a rectangular shape is advantageous from the viewpoint of machinability.

The FPC 32 has a structure formed by sticking a conductor metal foil to a thin-film-shaped insulator base film, and the structure except for terminal portions and soldered portions is protected by an insulator. As the insulator, polyimide, polyester, or the like may be used, and as the conductor, copper, copper foil, or the like may be used. Such an FPC 32 is available on the market. Without limitation to this, an arbitrary flexible board available on the market can be employed.

To a back surface of a sensor attaching surface of the sensor attaching portion 32a, a support member 33 having a flat plate shape conforming to the shape of the sensor attaching portion 32a is attached with an adhesive. The support member 33 is, for example, a metal plate. The support member 33 has a through hole 34 penetrating through the support member 33. The sensor attaching portion 32a has a through hole 36 at a position corresponding to the through hole 34. Conformity of the support member 33 in size to the sensor attaching portion 32a does not require perfect size matching of the support member 33 with the sensor attaching portion 32a, and the sensor attaching portion 32a may be slightly smaller than an outer shape of the support member 33.

On the sensor attaching surface of the FPC 32, a shield film 35 is provided from the lead wire portion 32b and beyond the boundary between the lead wire portion 32b and the sensor attaching portion 32a, so as to cover a part of the sensor attaching portion 32a.

The shield film 35 is an insulative plastic film of polyester, etc., on which a conductive metal such as aluminum or copper is deposited, and may have a hard-coat for protection on a surface. Without limitation to this, a shield technology for a flexible board that is available on the market can be optionally used.

As illustrated in FIGS. 6A and 6B, on a circular surface 22a of the yoke 22 on a side in proximity to the magnet 21 (that is, an upper surface of the yoke 22 in the illustrated example), a positioning recess 23 having a shape that fits the support member 33, that is, the sensor attaching portion 32a, is formed.

On a bottom surface of the positioning recess 23, a sensor accommodating recess 24 which can accommodate the temperature sensor 31 when the temperature detecting unit 30 is attached is formed. A shape and dimensions of the sensor accommodating recess 24 are not particularly limited as long as the sensor accommodating recess 24 can accommodate the temperature sensor 31. For example, the sensor accommodating recess 24 may be circular in a plan view. However, it is preferable that the sensor accommodating recess 24 has minimum dimensions to accommodate the temperature sensor 31, that is, a size and a shape that cause an inner surface of the sensor accommodating recess 24 to be as close as possible to the temperature sensor 31 when the temperature detecting unit 30 is attached. The sensor accommodating recess 24 is preferably formed inside the positioning recess 23 without making direct contact with an outer circumferential surface of the yoke 22.

Further, in a bottom surface of the positioning recess 23, a threaded hole 25 having female threads formed on an inner surface is formed, the female threads being screwed with a screw 41 to be described later, at a position that comes into alignment with the through hole 34 and the through hole 36 when the temperature detecting unit 30 is attached.

The temperature detecting unit 30 is attached in a state where the support member 33 is fitted into the positioning recess 23 by screwing the through hole 34 of the support member 33 and the through hole 36 of the FPC 32 with the threaded hole 25 of the yoke 22 by the screw 41 as illustrated in FIGS. 4, 7A, and 7B. As a result, the sensor attaching portion 32a closes the sensor accommodating recess 24. At this time, the temperature sensor 31 is accommodated in the sensor accommodating recess 24. In the illustration of the figures, the upper surface of the support member 33 and the surface of the yoke 22 are flush with each other, but do not necessarily have to be flush with each other. The upper surface of the support member 33 may be higher or lower than the surface of the yoke 22.

The temperature detecting unit 30 is attached in the following manner. First, in a state where the temperature sensor 31 is facing toward the surface (upper surface) 22a of the yoke 22, the support member 33 is positioned by fitting into the positioning recess 23 of the yoke 22. Accordingly, the through hole 34 of the support member 33, the through hole 36 of the FPC 32, and the threaded hole 25 of the yoke 22 are positionally aligned with each other. Screwing is performed by screwing the screw 41 in these holes. In this way, according to the electronic balance 1 of the present embodiment, the temperature detecting unit 30 can be attached to the electromagnetic unit 20 easily and in a short time.

Provision of the positioning recess 23 is not essential as described also in the following modifications. However, provision of the positioning recess 23 is advantageous since the support member 33 can be easily positioned. In addition, due to provision of the positioning recess 23, in the present embodiment in which fixation is performed by one screw 41, the sensor attaching portion 32a and the support member 33 can be prevented from rotating around the screw 41.

In this attachment state, the temperature sensor 31 is closed up in a space defined by side surfaces and a bottom surface of the sensor accommodating recess 24 and the sensor attaching portion 32a of the FPC 32.

As a result, the temperature sensor 31 is isolated from the outside, and is not exposed to the outside air. Influence of the outside air on a temperature detection value can be reduced. In addition, since the temperature detecting unit 30 (temperature sensor 31) is attached to a surface of the yoke 22 close to the magnet 21, a temperature of the yoke 22 can be regarded as a temperature of the magnet 21, the accuracy of detection of the temperature of the magnet 21 is improved, and accordingly, the accuracy of temperature correction of a weighed value is improved.

The material of the support member 33 is not limited to metal, and for example, may be other materials such as a resin plate. However, when a metal plate is used, due to its heat conductivity, by the influence of the heat from the yoke 22, temperatures of the yoke 22 and the support member 33 become substantially equal to each other by thermal binding, and the atmosphere in a space defined by the support member 33 and the sensor accommodating recess 24 becomes substantially equal to the temperature of the yoke 22, and the temperature of the yoke 22, hence, the magnet 21, can be accurately measured.

In the case where a metal plate is used as the support member 33, for example, use of a metal with a higher heat conductivity (for example, aluminum (236 W/(m·k), Chronological Scientific Tables No. 94, edited by National Astronomical Observatory of Japan, Maruzen Publishing Co., Ltd., 2021. The same applies hereinafter.)) or the like as the material for the yoke 22 and use of a metal with a lower heat conductivity (for example, SUS 304 (16 W/(m·k)) or the like as the material for the metal plate are particularly advantageous since this makes it easy to conduct the temperature from the yoke 22 and makes it difficult to conduct the temperature from the outside air, and the influence of the outside air can be further reduced.

Next, wiring of the FPC 32 of the temperature detecting unit 30 attached in this way will be described. The FPC 32 according to the present embodiment connects the temperature sensor 31 and the A/D converter 40, and at the time of connection, as illustrated in FIG. 3B, the FPC 32 is disposed so as to be directed from the upper surface to the bottom surface of the yoke and run along the bottom surface along the Roberval mechanism, and passes on the same plane so as to be connected to the A/D converter 40.

Therefore, as compared with conventional wiring using a cable, there are few spatial hindrances, and wire routing is organized. In addition, the position sensor 18 and the force coil that conventionally required separate cables can be connected by using the same FPC 32, so that the number of components can be reduced. Accordingly, spatial hindrance can be reduced, and the degree of freedom in design is increased.

Meanwhile, an electronic balance as electronic equipment is required to have EMC (Electromagnetic Compatibility). That is, an electronic balance needs to be designed and manufactured so as to be free from electromagnetic interference or normally operate even when it was electromagnetically interfered.

Figure 17:
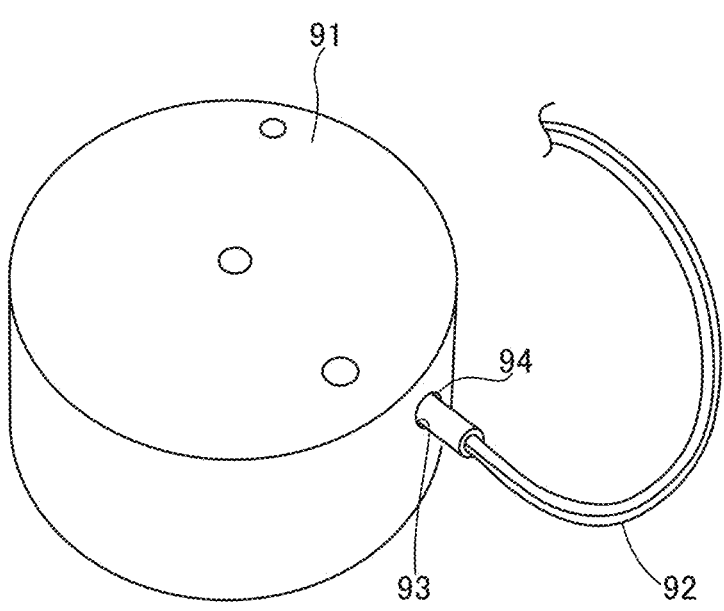
FIG. 17 is a view describing an attaching structure of a temperature detecting unit to a yoke of an electromagnetic unit in a conventional electronic balance.

In recent years, the standards of EMC have tightened. For example, the standards of radiated immunity related to durability against external noise, which had been test level 2 (3 V/m) in the radio wave test IEC 61000-4-3, have been changed to test level 3 (10 V/m). The conventional attaching method illustrated in FIG. 17 also has a problem in which the test level 3 is not met.

On the other hand, in the electronic balance 1 according to the present embodiment, in place of a normal wiring cord, the FPC 32 whose one surface is shielded with the shield film 35 is used. When the electronic balance 1 was subjected to the above-described radio wave test, as described in the section of experiment, it was confirmed that the test level 3 was met. Therefore, the labor and cost of separately shielding the wiring can be reduced in the electronic balance 1 as compared with the conventional electronic balance.

Further, in the electronic balance 1, the shield film 35 is provided on the temperature sensor attaching surface of the FPC 32 from the lead wire portion 32b and beyond the boundary between the lead wire portion 32b and the sensor attaching portion 32a so as to cover a part of the sensor attaching portion 32a. In addition, in the yoke 22, the sensor accommodating recess 24 is formed inside the positioning recess 23 so as not to come into direct contact with the surface of the yoke 22.

Adopting such configuration is not essential, however, according to this configuration, when the temperature detecting unit 30 is attached to the electromagnetic unit 20, an unshielded portion of the FPC 32 is not exposed to the outside, so that influence of noise can be more reliably prevented.

In addition, in the embodiment described above, when the support member 33 is a metal plate, electromagnetic waves are also shielded by the support member 33, so that the influence of noise is further reduced. For this purpose, when the support member 33 is a resin plate, a resin plate with a surface on which a metal is deposited may be used.

Modification 1

Figure 8A:
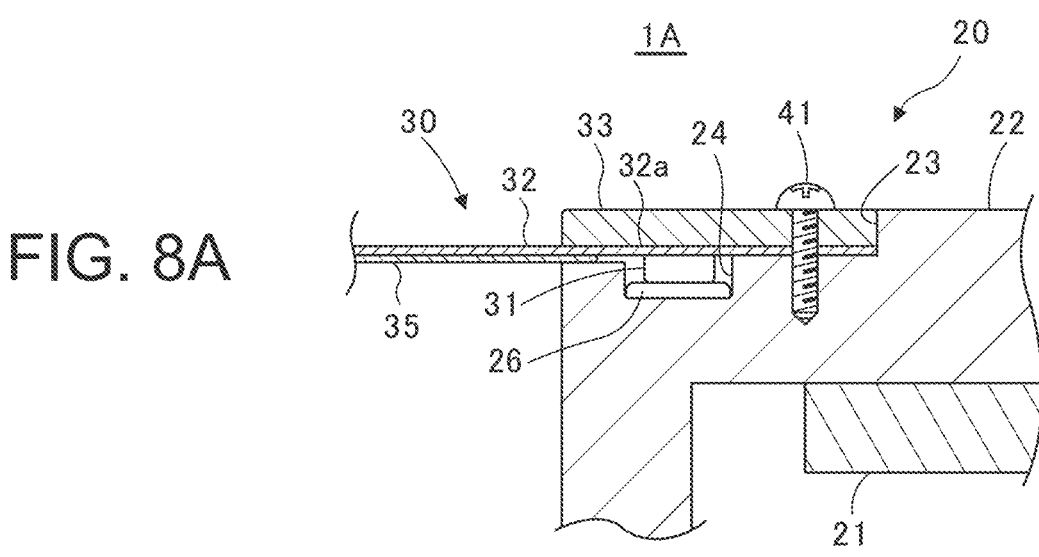
FIGS. 8A and 8B are views describing a coupled state between a temperature detecting unit and an electromagnetic unit in an electronic balance according to a modification of the same embodiment.

FIG. 8A is an enlarged view illustrating a state where a temperature detecting unit 30 is attached to an electromagnetic unit 20 of an electronic balance 1A according to a modification of the embodiment. In the electronic balance 1A, the electromagnetic unit 20 generally has the same configuration as that of the electromagnetic unit 20 of the electronic balance 1, but includes a heat-conductive resin sheet 26 made of a resin with a high heat conductivity provided on a bottom portion of the sensor accommodating recess 24.

As the heat-conductive resin sheet 26 with a high heat conductivity, for example, a resin sheet that contains a silicone gel and a heat-conductive filler, and has a heat conductivity of, for example, 1 W/(m·K) or more measured by a hot wire method, is preferably used. Such a heat-conductive resin sheet is available on the market.

Accordingly, heat of the yoke 22 is more easily conducted to the temperature sensor 31, and the temperature of the yoke 22, hence, the magnet 21, can be more accurately measured. Further, it is preferable that the heat-conductive resin sheet 26 is configured so that the temperature sensor 31 comes into contact with the sheet 26 when the temperature detecting unit 30 is attached to the electromagnetic unit 20 since this improves the heat conduction efficiency.

In the present modification, even when a liquid heat-conductive resin is poured into the sensor accommodating recess and cured and used in place of the heat-conductive resin sheet 26, an equivalent effect can be exerted. However, from the viewpoint of simplification of the manufacturing process, use of the heat-conductive resin sheet is advantageous.

Modification 2

Figure 8B:
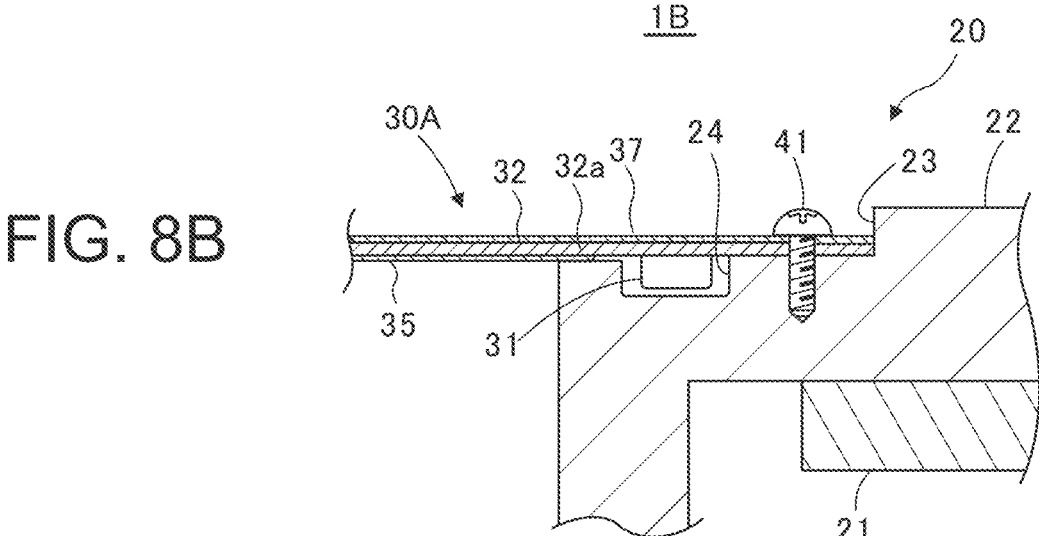

FIG. 8B is an enlarged view illustrating a state where a temperature detecting unit 30A is attached to an electromagnetic unit 20 of an electronic balance 1B according to Modification 2. In the electronic balance 1B, the temperature detecting unit 30A has substantially the same configuration as that of the temperature detecting unit 30, but does not include the support member 33. In addition, the temperature detecting unit 30A includes a shield film 37 equivalent to the shield film 35 on a surface opposite to the temperature sensor attaching surface of the FPC 32. That is, both surfaces of the FPC 32 are shielded. Thus, the support member 33 is not essential, and in place of this, the shield film 37 may be provided.

As described, even without the support member 33, the temperature sensor 31 is accommodated in a space defined by the sensor accommodating recess 24 and the sensor attaching portion 32a, so that it becomes unlikely that the temperature sensor 31 is influenced by the outside air, and the temperature of the magnet 21 can be measured with high accuracy.

In the present modification, as in the electronic balance 1, the above-described effect can be exerted even when the shield film 37 is not provided. However, attachment of the shield films 35 and 37 to both surfaces of the FPC 32 is advantageous since the influence of noise can be reduced.

Modification 3

Figures 9A, 9B:
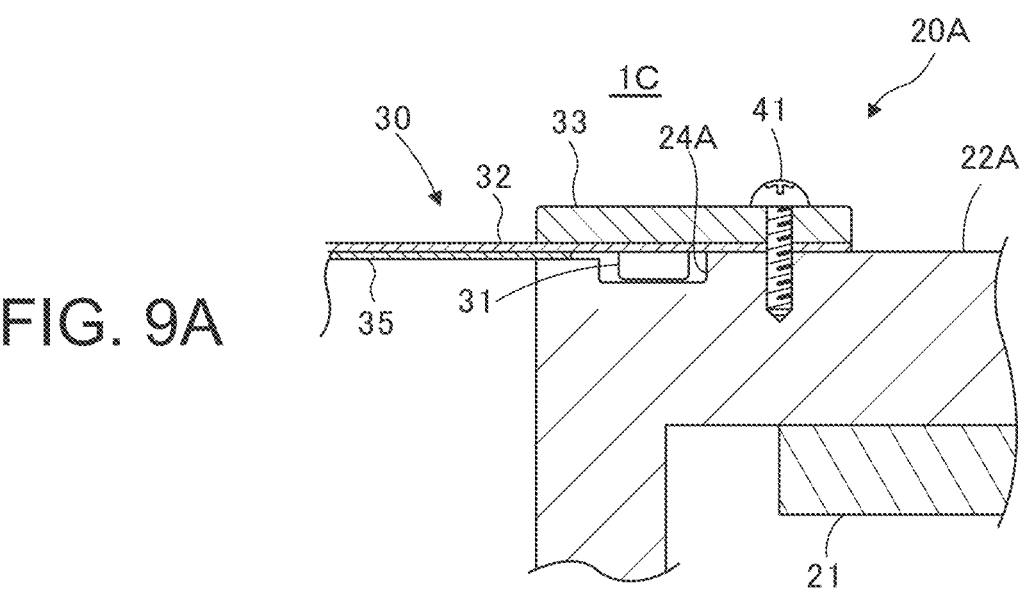
FIGS. 9A and 9B are views describing an attaching structure of a temperature detecting unit to an electromagnetic unit of an electronic balance according to another modification.

FIG. 9A is a sectional view illustrating a state where a temperature detecting unit 30 is attached to an electromagnetic unit 20A of an electronic balance 1C according to Modification 3. FIG. 9B is a plan view of the same. In the electronic balance 1C, the electromagnetic unit 20A has substantially the same configuration as that of the electromagnetic unit 20, however, the positioning recess 23 is not provided in a yoke 22A, and only a sensor accommodating recess 24A is provided. Even without the positioning recess 23, as the temperature sensor 31 is attached to the sensor attaching portion 32a of the FPC 32, just by positioning the temperature sensor 31 so that the temperature sensor 31 is accommodated in the sensor accommodating recess 24A and screwing it, the temperature sensor 31 can be easily attached. In addition, the temperature sensor 31 is to be accommodated in a space that is closed by the sensor accommodating recess 24A and the sensor attaching portion 32a, so that an effect of improving the accuracy of detection of the temperature of the magnet 21 can be exerted equivalently to the effect of the electronic balance 1.

Modification 4

Figure 10A:
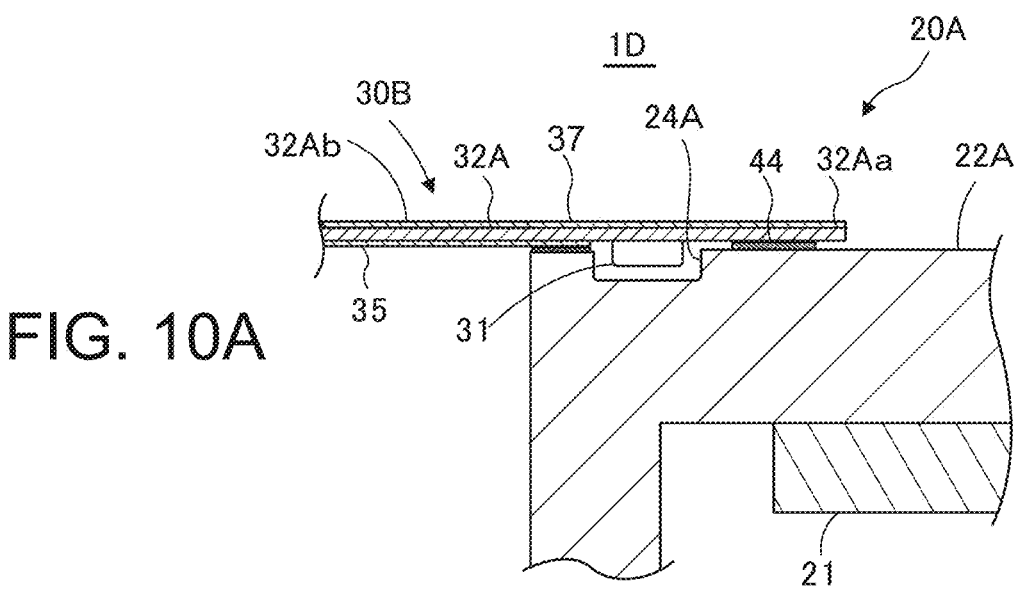
FIGS. 10A and 10B are views describing an attaching structure of a temperature detecting unit to an electromagnetic unit of an electronic balance according to still another modification.
Figure 10B:
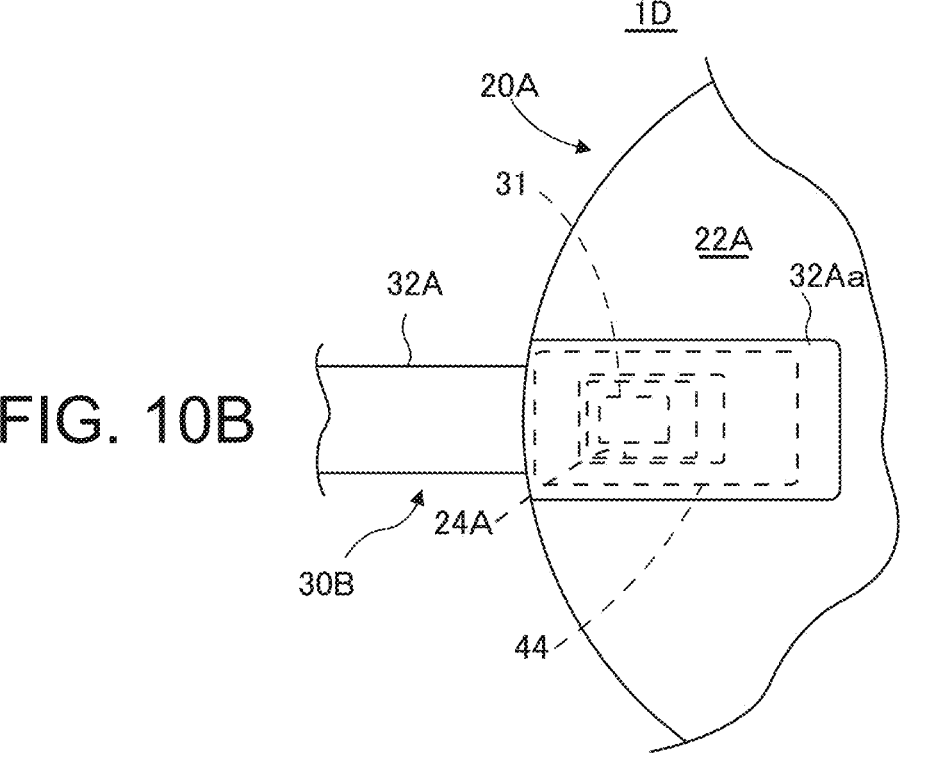

FIG. 10A is a sectional view illustrating a state where a temperature detecting unit 30B is attached to an electromagnetic unit 20A of an electronic balance 1D according to Modification 4, and FIG. 10B is a plan view of the same. In the electronic balance 1D, the electromagnetic unit 20A has the same configuration as that of the electromagnetic unit 20A of the electronic balance 1C. On the other hand, the temperature detecting unit 30B has substantially the same configuration as that of the temperature detecting unit 30, but has the following differences. The temperature detecting unit 30B does not include the support member 33 on a back surface of a sensor attaching portion 32Aa, but includes a shield film 37 extending to a lead wire portion 32Ab. In addition, the sensor attaching portion 32Aa is attached to a surface of the yoke 22A with an adhesive disposed to surround the circumference of the sensor accommodating recess 24A. As an attaching means, a double-coated tape or a hook and loop fastener may be used in place of the adhesive 44. As described, even when the support member is not provided, the temperature sensor 31 is accommodated in a space closed by the sensor accommodating recess 24A and the sensor attaching portion 32Aa, and an effect equivalent to that of the embodiment can be exerted. This modification of the attachment using an adhesive is applicable to all other modifications of the present embodiment.

Modification 5

Figure 11A:
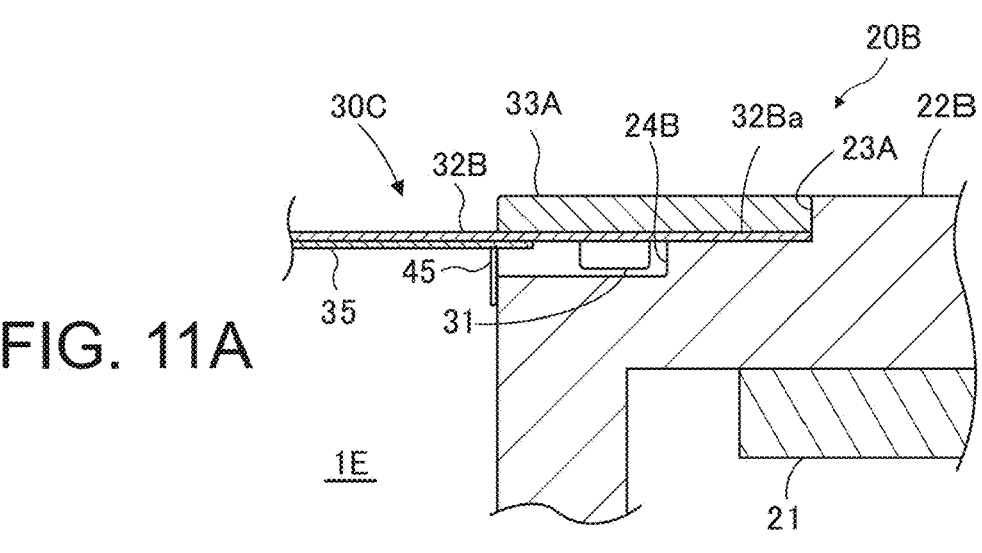
FIGS. 11A to 11C are views describing an attaching structure of a temperature detecting unit to an electromagnetic unit of an electronic balance according to still another modification.
Figure 11B:
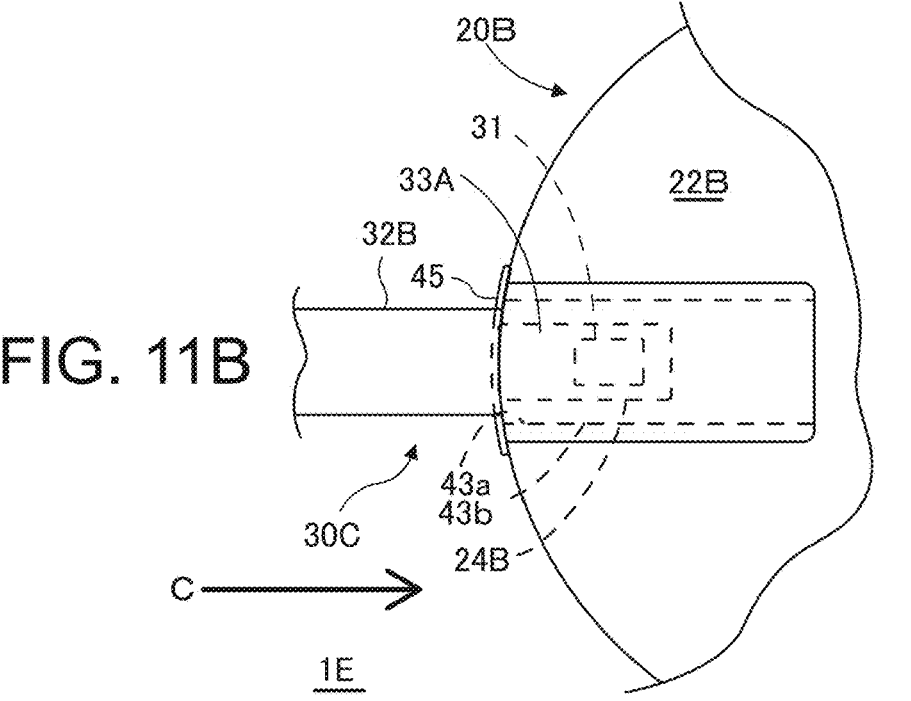
Figure 11C:
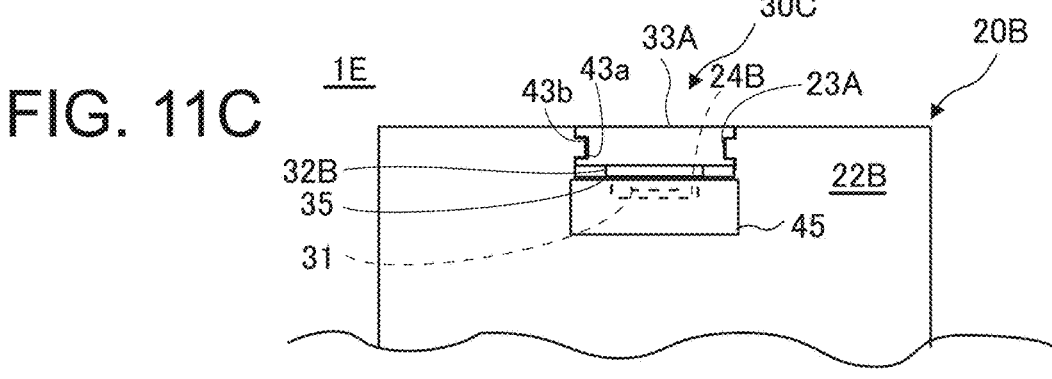

FIG. 11A is a sectional view illustrating a state where a temperature detecting unit 30C is attached to an electromagnetic unit 20B of an electronic balance 1E according to Modification 5. FIG. 11B is a plan view of the same, and FIG. 11C is a sectional view of the same as viewed from the arrow C direction in FIG. 11B. In the electronic balance 1E, the electromagnetic unit 20B has substantially the same configuration as that of the electromagnetic unit 20A, and the temperature detecting unit 30C has substantially the same configuration as that of the temperature detecting unit 30, but they have the following differences. That is, an FPC 32B and a support member 33A do not include threaded holes, and on both side surfaces of the support member 33A in a state where the side indicated by the arrow C is defined as a front side, rail-shaped grooves 43b are formed. A sensor accommodating recess 24B is formed so as to continue to a side surface of the yoke 22B. On both inner side surfaces of a positioning recess 23A, rail-shaped projections 43a that align with the grooves 43B are formed.

The support member 33A (that is, a sensor attaching portion 32Ba) is attached to the positioning recess 23A so that the projections 43a and the grooves 43b fit each other. An opening between the FPC 32B and the positioning recess 23A is then closed by a metal tape 45 stuck along the side surface of the yoke 22B. The metal tape 45 is preferably a copper tape. In the present modification, when the sensor accommodating recess 24B is closed with the sensor attaching portion 32Ba (and the support member 33A), a part of the sensor accommodating recess 24B is closed by a metal tape. In this way as well, the temperature detecting unit can be easily attached, so that an effect equivalent to that of the electronic balance 1 according to the embodiment can be exerted. This modification of the attachment by means of fixed fitting is applicable to all other modifications of the present embodiment.

Modifications 6 and 7

Figures 12A, 12B:
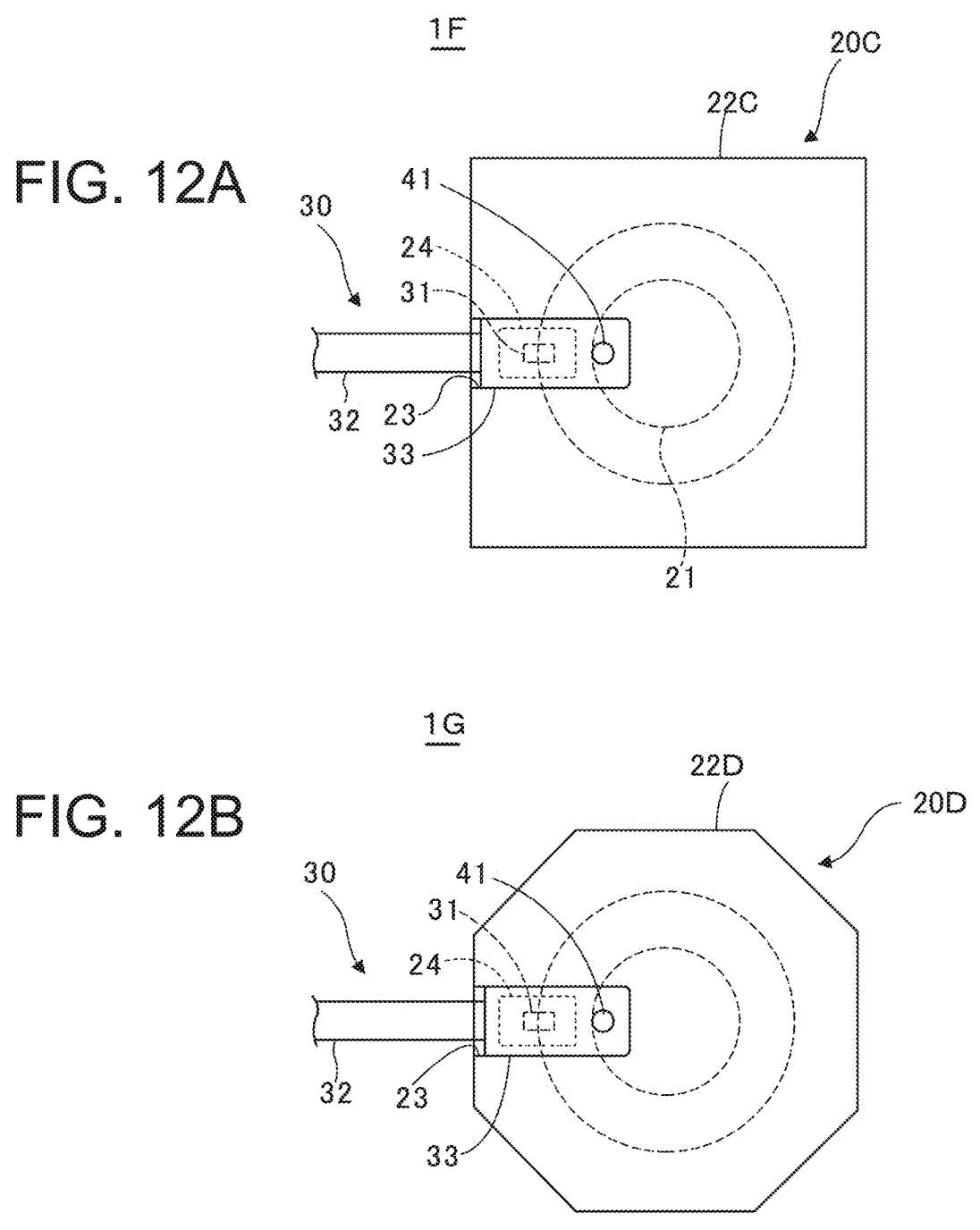

FIG. 12A is a plan view illustrating a state where a temperature detecting unit 30 is attached to an electromagnetic unit 20C of an electronic balance 1F according to Modification 6. FIG. 12B is a plan view illustrating a state where a temperature detecting unit 30 is attached to an electromagnetic unit 20D of an electronic balance 1G according to Modification 7. In the electronic balances 1F and 1G, the electromagnetic units 20C and 20D have substantially the same configuration as that of the electromagnetic unit 20, but are different in that yokes 22C and 22D are respectively in a quadrilateral prism having a columnar void inside and an upper surface, and in an octagonal prism having a columnar void inside and an upper surface. However, regardless of the shapes of the yokes 22C and 22D, an equivalent effect can be exerted as long as an attaching position of the temperature detecting unit 30 is a position close to the magnet 21. These modifications are applicable to all other modifications of the present embodiment.

Modification 8

FIG. 13A is a plan view illustrating a state where a temperature detecting unit 30 is attached to an electromagnetic unit 20E of an electronic balance 1H according to Modification 8, and FIG. 10B is a front view of the same. The electromagnetic unit 20E has substantially the same configuration as that of the electromagnetic unit 20C, that is, in a quadrilateral prism having a columnar void inside and an upper surface, but is different in that an attaching position of the temperature detecting unit 30 is not on an upper surface but on a front surface (side surface) of a yoke 22E. Further, the attaching position is at an upper portion of the front surface of the yoke 22E. Even when the attaching position of the temperature detecting unit 30 is made different in this way, an effect equivalent to that of the electronic balance 1 of the embodiment can be exerted as long as the attaching position is near the magnet 21. This modification is applicable to all other modifications of the present embodiment.

Modification 9

Figures 14A, 14B:
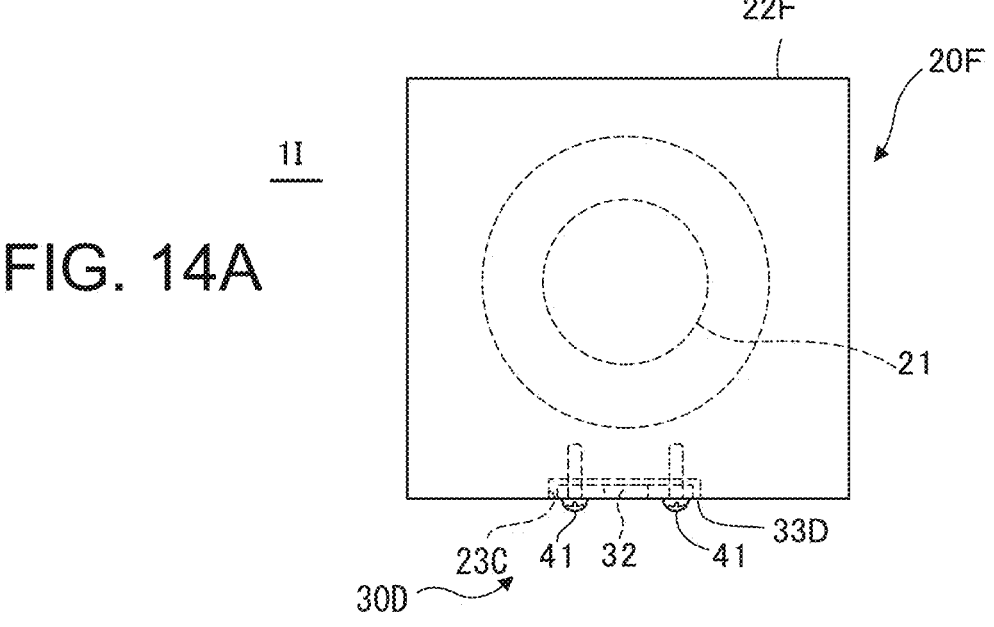
FIGS. 14A and 14B are views describing an attaching structure of a temperature detecting unit to an electromagnetic unit of an electronic balance according to still another modification.

FIG. 14A is a plan view illustrating a state where a temperature detecting unit 30D is attached to an electromagnetic unit 20F of an electronic balance 1I according to Modification 9. FIG. 14B is a front view of the same. The temperature detecting unit 30D has substantially the same configuration as that of the temperature detecting unit 30, however, the shape and dimensions of a support member 33D (that is, the sensor attaching portion) and the number and disposition of through holes as attaching means are different. The electromagnetic unit 20F has substantially the same configuration as that of the electromagnetic unit 20C, however, positions and dimensions of a positioning recess 23C and a sensor accommodating recess 24B are different. As a result, the attaching position and direction of the temperature detecting unit 30D are different. However, in this case as well, the temperature detecting unit 30D is attached near the magnet 21 in a yoke 22F, so that an effect equivalent to that of the electronic balance 1 according to the embodiment can be exerted. This Modification is applicable to all other modifications of the present embodiment.

Modification 10

Figure 15:
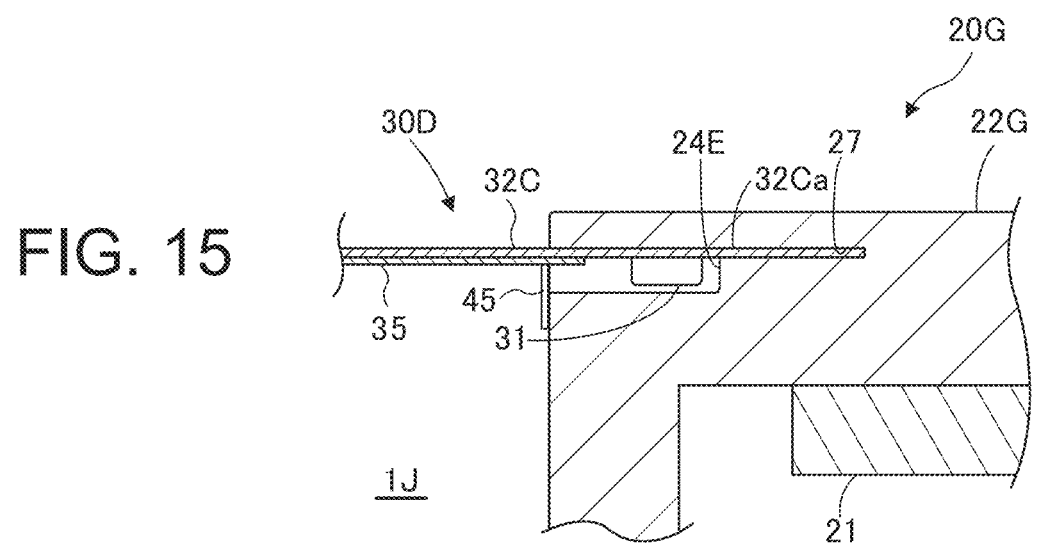

FIG. 15 is a sectional view illustrating a state where a temperature detecting unit 30D is attached to an electromagnetic unit 20G of an electronic balance 1J according to Modification 10, and in the electronic balance 1J, a sensor accommodating recess 24E is provided on a side surface of the yoke 22G. In the present modification, a sensor attaching portion 32Ca in an FPC 32C is preferably constituted of a flex rigid board formed by integrating a flexible board and a rigid board. Alternatively, it is preferable to secure strength by having a large polyimide film thickness of the sensor attaching portion 32Ca of the FPC 32C. In addition, the sensor attaching portion 32a may include a support member not illustrated. At an upper portion of an inner wall of a deepest portion of the sensor accommodating recess 24E, a recess portion 27 that fits the sensor attaching portion 32Ca is provided. The sensor attaching portion 32Ca is fixed in an unremovable manner by inserting a tip end of the sensor attaching portion 32Ca into the recess portion 27. An opening in a side surface of the sensor accommodating recess 24C is closed by a metal tape (copper tape) 45. In this case as well, as in Modifications 1 to 9, the temperature sensor 31 is closed up in a space defined by an inner wall of the sensor accommodating recess 24E, the sensor attaching portion 32Ca, and the metal tape 45, and is isolated from the outside air. The attachment is performed just by inserting the tip end of the sensor attaching portion 32Ca and closing it with the metal tape 45, so that an effect equivalent to that of the electronic balance 1 of the embodiment can be exerted.

EXPERIMENT

Figure 16A:
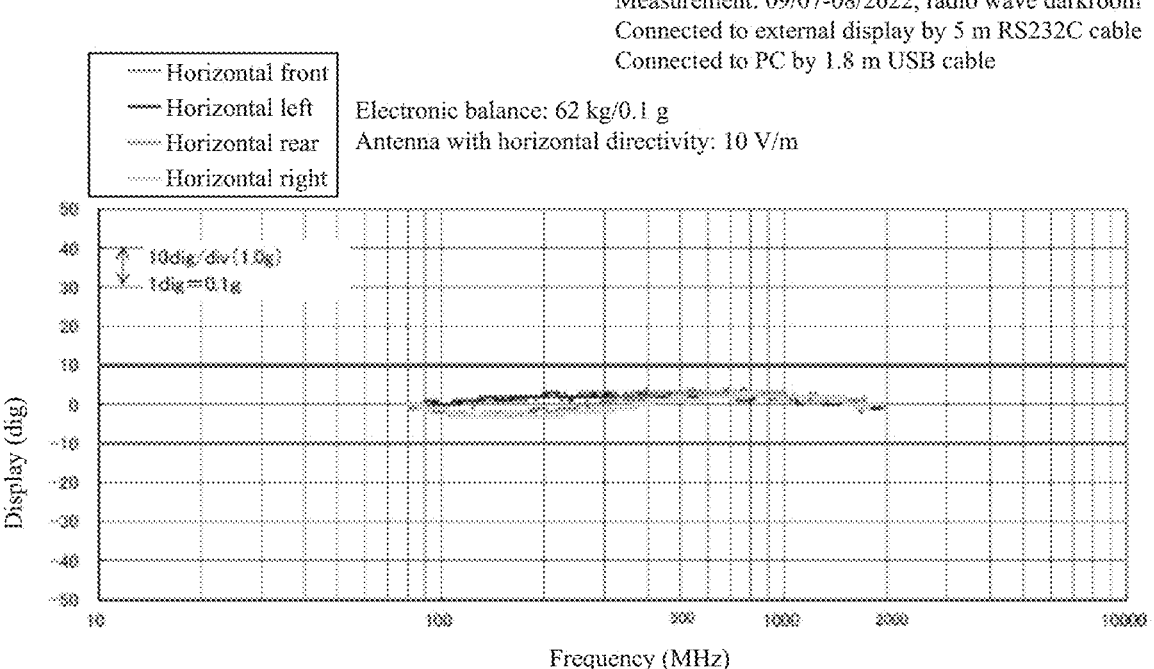
FIGS. 16A and 16B are graphs illustrating results of a radio wave test using the electronic balance according to the embodiment.
Figure 16B:
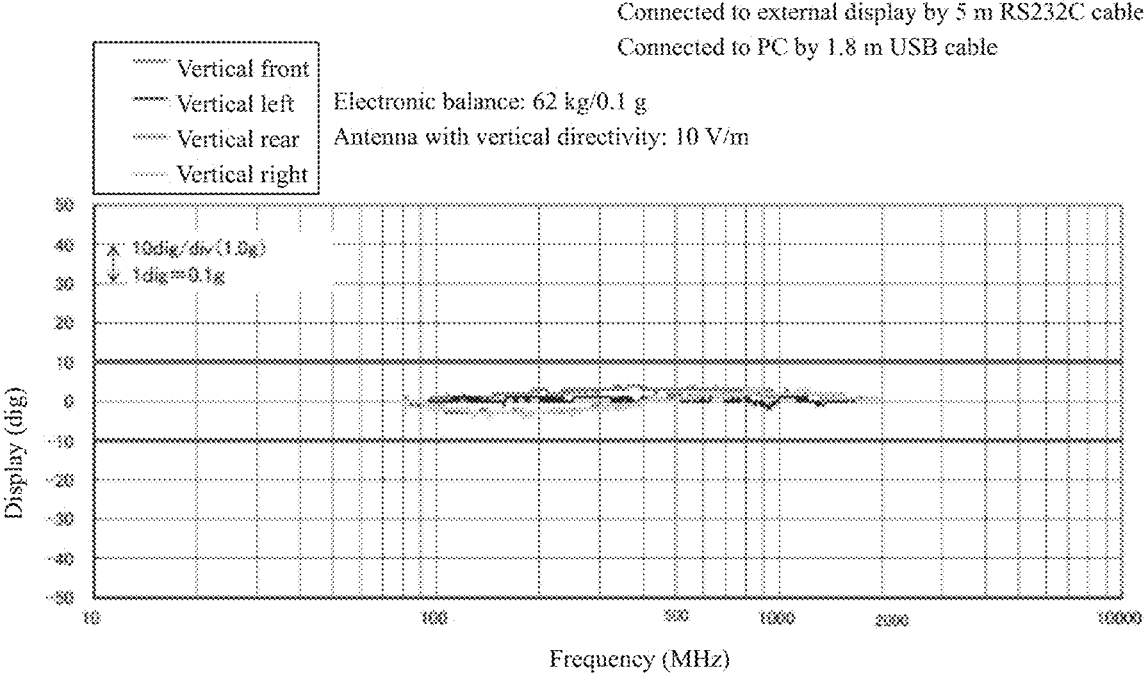

FIGS. 16A and 16B illustrate results of a radio wave test IEC 61000-4-3 conducted by using the electronic balance 1 of the embodiment. The experiment was conducted by placing the electronic balance 1 on a nonconductive table with a height of 0.8 m, and routing a portion (1 m) of a cable that can be wired from the balance so as to run along a borderline of 10 V/m as installation for the test. FIG. 16A illustrates changes in weighed value at the time of irradiation by sweeping the frequency in steps of 1% in the horizontal direction, and FIG. 16B illustrates a change in weighed value at the time of irradiation by sweeping the frequency in steps of 1% in the vertical direction. ±10 dig represented by thick lines in the figures, that is, 1 g is a permissible range in the balance. Accordingly, it was found that the requirements of EMC were met in the electronic balance of the embodiment.

Although a preferred embodiment and modifications thereof according to the present invention have been described above, the embodiment and the modifications can be modified and combined based on knowledge of a person skilled in the art, and such modified or combined embodiments are also included in the scope of the present invention.

REFERENCE SIGNS LIST

20, 20A, 20B, 20C, 20D, 20E, 20F, 20G: Electromagnetic unit
21: Magnet
22, 22A, 22B, 22C, 22D, 22E, 22F, 22G: Yoke
23, 23A, 23C: Positioning recess
24, 24A, 24B, 24C, 24D, 24E: Sensor accommodating recess
25: Threaded hole
26: Heat-conductive resin sheet
31: Temperature sensor
32: Flexible board (FPC)
32a, 32Aa, 32Ba, 32Ca: Sensor attaching portion
32b: Lead wire portion
33, 33A, 33B, 33C, 33D: Support member
34: Through hole
36: Through hole
40: A/D converter
41: Screw
45: Metal tape
The invention claimed is:

1. An electronic balance comprising:
an electromagnetic unit including a magnet, a yoke which the magnet is disposed inside, and a coil disposed in a magnetic field of the magnet, and configured to achieve a balance with a load of a to-be-weighed object by supplying a current to the coil;
a temperature sensor configured to detect a temperature of the electromagnetic unit; and
an A/D converter to be connected to the electromagnetic unit and the temperature sensor, wherein
the temperature sensor is attached to a flexible board including a sensor attaching portion to which the temperature sensor is attached and a lead wire portion configured to connect the temperature sensor to the A/D converter,
a sensor accommodating recess capable of accommodating the temperature sensor is formed on a surface of the yoke, and
the temperature sensor is attached to the electromagnetic unit so that the temperature sensor is accommodated in the sensor accommodating recess, and the sensor attaching portion closes the sensor accommodating recess.

2. The electronic balance according to claim 1, wherein
a positioning recess having a shape to fit the sensor attaching portion is formed on a surface of the yoke,
the sensor accommodating recess is formed on a bottom surface of the positioning recess, and
the temperature sensor is attached so that the temperature sensor is accommodated in the sensor accommodating recess, and the sensor attaching portion fits into the positioning recess.

3. The electronic balance according to claim 2, wherein at least one surface of the flexible board is shielded.

4. The electronic balance according to claim 2, wherein the sensor attaching portion is supported by a support member having a flat plate shape conforming to a shape of the sensor attaching portion.

5. The electronic balance according to claim 4, wherein the support member is a metal plate.

6. The electronic balance according to claim 2, comprising a heat-conductive resin sheet between the bottom surface of the sensor accommodating recess and the temperature sensor.

7. The electronic balance according to claim 2, wherein the flexible board is attached by screwing to the yoke by screwing a threaded hole formed on the bottom surface of the positioning recess and a hole provided in the sensor attaching portion with each other by a screw.

8. The electronic balance according to claim 1, wherein at least one surface of the flexible board is shielded.

9. The electronic balance according to claim 1, wherein the sensor attaching portion is supported by a support member having a flat plate shape conforming to a shape of the sensor attaching portion.

10. The electronic balance according to claim 9, wherein the support member is a metal plate.

11. The electronic balance according to claim 1, comprising a heat-conductive resin sheet between the bottom surface of the sensor accommodating recess and the temperature sensor.

12. The electronic balance according to claim 1, wherein the flexible board is attached by screwing to the yoke by screwing a threaded hole formed on the surface of the yoke and a hole provided in the sensor attaching portion with each other by a screw.

13. An electronic balance comprising:
an electromagnetic unit including a magnet, a yoke which the magnet is disposed inside, and a coil disposed in a magnetic field of the magnet, and configured to achieve a balance with a load of a to-be-weighed object by supplying a current to the coil;
a temperature sensor configured to detect a temperature of the electromagnetic unit; and
an A/D converter to be connected to the electromagnetic unit and the temperature sensor, wherein the temperature sensor is attached to a flexible board including a sensor attaching portion to which the temperature sensor is attached and a lead wire portion configured to connect the temperature sensor to the A/D converter, a sensor accommodating recess capable of accommodating the temperature sensor is formed on a surface of the yoke, and the temperature sensor is attached to the electromagnetic unit so that the temperature sensor is accommodated in the sensor accommodating recess, and the sensor attaching portion and a metal tape close the sensor accommodating recess.

* * * * *